US008699005B2

(12) United States Patent
Likholyot

(10) Patent No.: US 8,699,005 B2
(45) Date of Patent: Apr. 15, 2014

(54) INDOOR SURVEYING APPARATUS

(75) Inventor: Alexander Likholyot, Kitchener (CA)

(73) Assignee: Planitar Inc, Kitchener (CA)

( * ) Notice: Subject to any disclaimer, the term of this patent is extended or adjusted under 35 U.S.C. 154(b) by 117 days.

(21) Appl. No.: 13/481,850

(22) Filed: May 27, 2012

(65) Prior Publication Data

US 2013/0314688 A1 Nov. 28, 2013

(51) Int. Cl.
*G01C 3/08* (2006.01)

(52) U.S. Cl.
USPC .......... 356/3.1; 356/3.01; 356/4.01; 356/5.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 7,460,214 B2 | 12/2008 | Schiavi | |
| 2004/0122628 A1* | 6/2004 | Laurie | 703/1 |
| 2004/0233461 A1* | 11/2004 | Armstrong et al. | 356/620 |
| 2008/0151264 A1* | 6/2008 | Spencer | 356/601 |

OTHER PUBLICATIONS

P. Biber, H. Andreasson, T. Duckett, A. Schilling, "3D Modeling of Indoor Environments by a Mobile Robot with a Laser Scanner and Panoramic Camera" in Proc. Int. Conf. on Intelligent Robots and Systems (2004) IEEE, pp. 3430-3435, vol. 4.

S. Kohlbrecher, J. Meyer, O Von Stryk, U. Klingauf, "A Flexible and Scalable SLAM System with Full 3D Motion Estimation" in Proc. IEEE Int. Symp. on Safety, Security and Rescue Robotics (2011), pp. 155-160.

Z. Zhang, "A flexible new technique for camera calibration" in IEEE Transactions on Pattern Analysis and Machine Intelligence (2000), pp. 1330-1334, vol. 22 , iss. 11.

X. Brun, F. Goulette, "Modeling and Calibration of Coupled Fish-Eye CCD Camera and Laser Range Scanner for Outdoor Environment Reconstruction" in Proc. 6th Int. Conf. on 3-D Digital Imaging and Modeling (2007), pp. 320-327.

Note to examiner: A surveying apparatus including some elements cited in the claims, except the "computing device executing an algorithm for automatically projecting 2D data sets . . . " (claim 1) was used commercially by the inventor for more than a year for producing virtual tours example of which can be viewed at http://www.visualfloorplans.com/tours/sample1/. More specifically, the apparatus includes: a DSLR camera with a 185 degree field of view panoramic fisheye lens.

* cited by examiner

*Primary Examiner* — Luke Ratcliffe

(57) ABSTRACT

An indoor surveying apparatus comprises a 2D range finder, means for automatically aligning 2D range finder data and computing a 2D map of the environment, a calibrated optical imaging system for capturing images of environment, and means for establishing positions and extents of walls, doors, and windows and for drawing floor plans using the computed 2D map and calibrated images where 2D range finder data is missing. It is further contemplated that the imaging system can also be part of the range finder, that the range finder can be a scanning laser range finder, that the imaging system can include a panoramic lens with 180 degree field of view, that the apparatus can further include an IMU, an electronic compass, a panoramic rotator, and means for measuring positions of points on the floor using the image data.

10 Claims, 3 Drawing Sheets

INDOOR SURVEYING APPARATUS

BACKGROUND OF THE INVENTION

The field of the present invention is surveying apparatuses for measuring layout of buildings. A surveying apparatus necessarily performs a geometric instrument function and, depending on the underlying technology, can perform an optical measuring function.

Currently, buildings are surveyed most of the time using simple measuring tools, such as a mechanical tape measure or a laser "tape measure"—a laser distance meter. U.S. Pat. No. 7,640,214 and U.S. patent application Ser. No. 10/724,259 describe systems that add angle measuring capabilities to laser distance meters to increase speed and efficiency with which the measurements can be done. Nevertheless, a workflow using such tools is very slow and a surveyor needs to spend a considerable amount of time on-site taking measurements.

It would be advantageous to be able to capture surveying data on-site quickly and to allow post-processing and analysis of data and creation of floor plans to be carried out elsewhere. In addition, it would be advantageous to capture image data for the purpose of documenting a site in a fashion that would allow the image data to be correlated with floor plans, for example, by recording an accurate location and direction from which an image was taken. Such instruments and a combination of measurement and image data can find uses in several industries. As an example, in a real estate industry or in an insurance industry such an indoor surveying apparatus can be used for capturing floor plans and images of a property that can be subsequently displayed in a virtual tour. As a further example, in forensic sciences such an indoor surveying apparatus can be used for documenting a crime scene and can provide a capability to make subsequent measurements using captured floor plan and image data. As yet another example, in a construction industry such an indoor surveying apparatus can be used to capture structural elements of a building at various construction stages, such as capturing a house frame with embedded wiring before drywall gets installed.

Currently, the only commercially available technology for capturing correlated dimensioned layout and image data is a 3D laser scanner that includes a camera for capturing image or texture data that can be overlaid on a 3D point cloud. Several manufacturers offer such instruments that have high accuracy and long range, which makes them suitable for both indoor and outdoor applications requiring high resolution. The software provided with the 3D laser scanners typically allows extracting 2D slices from 3D point cloud that can be used for drawing floor plans. While such instruments are versatile, the amount of data they capture is excessive for the usage scenarios listed above, the time required to capture a 3D scan of a room is still on the order of few minutes, and the cost of such instruments is prohibitively expensive for the mentioned uses.

Currently, an active research topic in the field of robotics at universities is unmanned ground and aerial vehicles (robots) that are capable of mapping and modeling their environment. Such robots often have a 2D scanning laser range finder and one or more cameras for capturing video or still images. In some robots, the cameras are calibrated and aligned with laser range finders. During navigation such robots use Simultaneous Localization And Mapping (SLAM) algorithms to dynamically build a 2D point cloud map of their environment using the laser range finder data and compute their position and orientation on that map. See P. Biber et al. "3D Modeling of Indoor Environments by a Mobile Robot with a Laser Scanner and Panoramic Camera" in Proc. Int. Conf. on Intelligent Robots and Systems (2004) and S. Kohlbrecher et el. "A Flexible and Scalable SLAM System with Full 3D Motion Estimation" in Proc. IEEE Int. Symp. on Safety, Security and Rescue Robotics (2011). These and all other referenced publications are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

Since the robots described above are not designed for the indoor surveying usage scenarios such as those listed earlier, their use for such purposes would be complicated for an average user and too time-consuming. In addition, they do not provide means for drawing floor plans and creating virtual tours.

Therefore, there remains a considerable need for an indoor surveying apparatus that can measure layout and capture images correlated with the measurement data, perform these tasks quickly, allow off-line processing and analysis of data, be easy to use, and have reasonable cost.

BRIEF SUMMARY OF THE INVENTION

The present invention is directed to an indoor surveying apparatus having a 2D range finder that can measure 2D data sets, a computing device executing an algorithm for automatically projecting measured 2D data sets onto a horizontal plane and automatically aligning the projected 2D data sets to construct a map of indoor environment consisting of points of the projected 2D data sets, a calibrated optical imaging system that has a known position and orientation relative to the range finder, and a computing device executing an algorithm for processing the constructed map and image data to create floor plans and images correlated with the floor plans. In addition to being part of a survey data set and visually documenting a site, such images can be used for establishing positions and extents of walls, doors, and windows and drawing floor plans where the map information is missing.

Among the many different possibilities contemplated, the 2D range finder can be a scanning laser range finder. It is further contemplated that the 2D range finder can be a triangulation laser range finger having a laser source with a 2D emission pattern and an optical imaging system that is used for both capturing images and measuring 2D data sets. It is yet further contemplated that the optical imaging system can advantageously have a panoramic lens with a field of view of at least 180 degrees. It is still further contemplated that an indoor surveying apparatus with a panoramic lens can advantageously include a rotator that enables the surveying apparatus to be repeatably rotated into pre-determined angular positions. Such a rotator can advantageously have two pre-determined angular positions spaced 180 degrees apart or three pre-determined angular positions spaced 120 degrees apart. It is yet further contemplated that an indoor surveying apparatus can advantageously include an inertial measurement unit. It is still further contemplated that an indoor surveying apparatus can advantageously include an electronic compass. Yet another contemplated embodiment has an indoor surveying apparatus advantageously including a computing device executing an algorithm for measuring positions of points on the floor by triangulation using images captured by the imaging system, calibration coefficients of the imaging system, and distance from the imaging system to the floor.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING

FIG. 3 is intended to illustrate how images that are correlated with 2D data sets can be used for establishing positions and extents of walls, doors, and windows and drawing floor plans where the 2D data set information is missing.

DETAILED DESCRIPTION OF THE INVENTION

Figure 1:
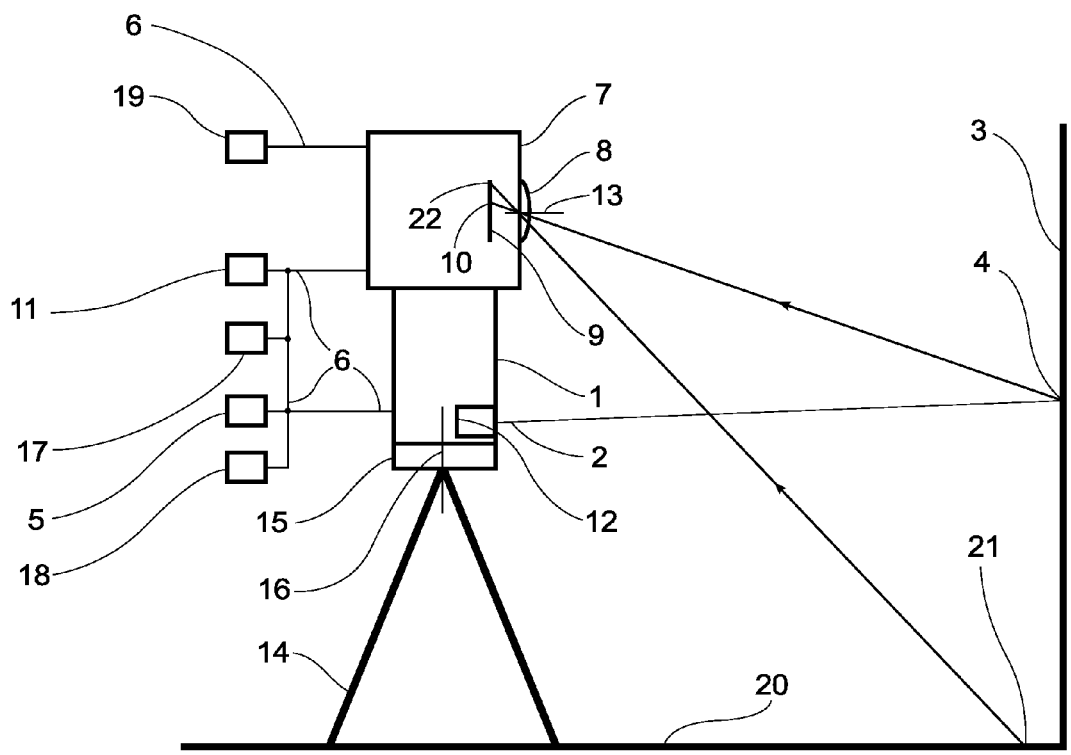
FIG. 1 is a conceptual diagram of an indoor surveying apparatus in its environment according to one embodiment of the invention. Not all of the elements shown in FIG. 1 may be present in other possible embodiments. The elements are shown in FIG. 1 to illustrate their functional relationship to each other when they are present in an embodiment.

Features and advantages of the present invention will be better understood by reading the following detailed description, taken together with the drawing.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

An indoor surveying apparatus according to the present invention includes several subsystems that inter-operate. Each of the subsystems, including some of their possible variants, will be defined and described in the following discussion. It has to be understood that various embodiments of an indoor surveying apparatus according to the present invention can include any suitable combination of possible variants of the constituting subsystems.

2D Range Finder

As shown in FIG. 1, one of the constituting subsystems of an indoor surveying apparatus according to the present invention is a 2D range finder 1. As used in this description and in the appended claims, a 2D range finder means an instrument that measures distance from itself to points 4 on surfaces of objects 3 in three dimensional (3D) space along a set of straight measurement lines, wherein all the measurement lines belong to a two dimensional (2D) surface in 3D space and direction of each line is either known or can be established in the course of a measurement. That 2D surface defines the 2D measurement surface 2 of the range finder, as used in this description and in the appended claims. The points that are located at intersection of the measurement lines and distant surfaces and that are measured from the same position and orientation of the range finder in 3D space define a 2D data set, as used in this description and in the appended claims. Different 2D data sets result from measurements performed at different positions and orientations of the 2D range finder.

In some embodiments the measurement surface can be a single plane. In other embodiments the measurement surface can be a conical surface, as can be represented by surface 2. In yet other embodiments the measurement surface can be discontinuous and can consist of a set of 2D surfaces, for example, a set of planar surfaces. In general, any suitable set of 2D surfaces that can contain all suitable measurement lines is contemplated. In preferred embodiments the overall orientation of the measurement surface is substantially horizontal rather than vertical. For a conical surface this means that the axis of the cone is substantially vertical.

Various commercially available instruments fit the above definition of 2D range finder and can be used in an indoor surveying apparatus. In preferred embodiments the 2D range finder is a scanning laser range finder. For example, it can be a scanning laser range finder such as those produced by SICK AG or by Hokuyo Automatic Co., Ltd. Scanning laser range finders based on a variety of principles of operation known to those skilled in the art, including, but not limited to, time of flight and phase delay techniques, are contemplated.

In less preferred embodiments the 2D range finder can be a triangulation laser range finder having a laser radiation source 12 with a 2D emission pattern and an optical imaging system 7 for detecting the emitted laser light after it reflected off a distant surface 3. The imaging system comprises an objective lens 8 and an image sensor 9 that captures images 10 of points 4 that belong to the intersection of a distant surface 3 with the emitted laser light propagating along the measurement surface 2. In some embodiments (not shown), the 2D emission pattern of the laser radiation source 12 can be realized by rotating a laser beam with a mirror spinning around an axis that is substantially coincidental with the laser beam and the mirror forming an angle with the laser beam. In the case of the 45 degree angle, the measurement surface is a plane, in other cases the measurement surface is conical. The rotation speed of the mirror needs to be high enough for the laser beam to sweep at least once across the field of view of the objective lens 8 during an exposure time of the image sensor 9. More preferably, the 2D emission pattern of the laser radiation source 12 is formed by at least one laser with line generating optics, for example with a Powell lens. The fan angle of the line generating optics should preferably be equal to or greater than the field of view of the objective lens 8 to enable surveying the largest area possible. Due to various design constraints, such as possible regulatory limitations on power of a single laser taken together with a desired intensity of the laser line, it may be advantageous to have more than one laser with line generating optics, with the lasers arranged to cover the field of view of the objective lens 8 such that the sum of the fan angles of all the line generating optical elements is preferably equal to or greater than the field of view of the objective lens 8.

A triangulation laser range finder is a type of 2D range finder that operates by projecting a laser light onto a distant surface 3 and capturing the laser light reflected from points 4 onto the image sensor 9. Distances to objects and directions of measurement lines are computed from pixel positions of the detected laser light on the image sensor 9. To make it easier to isolate detected laser light in an image, a technique known as background subtraction can be used. In this technique, two images are taken, a first image with laser illumination and a second image without it. The second image is then subtracted from the first image and the resulting image will predominantly contain detected laser light. Correcting the resulting image for lens distortion, back-projecting rays originating at pixels containing the detected laser light and intersecting these rays with the measurement surface 2 formed by the laser light emitted from the laser radiation source 12 are the steps needed to compute coordinates of points 4. All these are standard steps well known to those skilled in the art.

Calibration coefficients describing focal length and distortion of the objective lens 8, position and orientation of the image sensor 9 relative to the objective lens 8 that are needed for the above-mentioned steps can be obtained by any of the numerous methods of camera calibration known to those skilled in the art. See, for example, Z. Zhang "A flexible new technique for camera calibration" in IEEE Transactions on Pattern Analysis and Machine Intelligence (2000), where a flat calibration object with a pattern of known geometry is photographed by a camera from different poses and the calibration object's position and orientation for each pose are fitted together with the camera's calibration coefficients.

A further set of calibration coefficients needed to compute coordinates of points 4 describes position and orientation of the imaging system 7 relative to the measurement surface 2 and it can be obtained, for example, in the following way. After performing a first calibration step according to the cited method by Z. Zhang, the flat calibration object that was used during the first step is photographed by the imaging system 7 at several poses such that every light ray emitted by the laser radiation source 12 is intersected at at least two different distances from the source, thus sampling each measurement line at at least two points. Next, position and orientation of the calibration object in 3D space for each pose is computed by a non-linear least squares method in a similar way to how it was done in the first step to yield position and orientation of the front plane of the flat calibration object relative to the imaging system 7. Back-projecting of rays originating at pixels containing the detected laser light to intersect with all such front planes yields 3D coordinates of the intersection points relative to the imaging system 7. These intersection points then completely describe the measurement surface of the triangulation laser range finder and can be fitted to a model to yield a mathematical description of the measurement surface 2 in a coordinate system of the imaging system 7. For example, in the case where the laser radiation source 12 comprises a set of lasers with line generating optics, the model of the measurement surface can be a set of planar sectors with the angle of each sector being equal to the fan angle of the corresponding line generating optics.

As will be discussed in greater detail later in this disclosure, another constituting subsystem of an indoor surveying apparatus according to the present invention is an optical measurement system for capturing images of the environment. The advantage of using the described triangulation laser range finder in an indoor surveying apparatus according to the present invention lies in the fact that the same optical system can be used for both capturing images and detecting reflected laser light as part of the 2D range finder, thus, resulting in a lower cost system. The disadvantage of a triangulation laser range finder is a nearly quadratic dependence of measurement error on measured distance. In contrast, measurement error of a scanning laser range finder is nearly constant with measured distance. The choice of a type of 2D range finder ultimately depends on application accuracy and cost requirements. There are, of course, many variants to the 2D range finder, and all such variations are contemplated.

Means for Automatically Projecting and Aligning 2D Data Sets

As shown in FIG. 1, one of the constituting subsystems of an indoor surveying apparatus according to the present invention is the computing device 5 executing an algorithm for automatically projecting and aligning 2D data sets. The description of the functionality of this subsystem follows.

During surveying of a building, the majority of distant surfaces being measured are vertical walls. Measured 2D data sets resulting from vertical walls can and must be projected onto a horizontal plane to support further drawing of floor plans. This projection requires knowing tilt of the range finder relative to the direction of gravity. Tilt of the range finder can be set to a fixed value by any suitable means, for example using a bubble level. Alternatively, tilt of the range finder can be measured by any suitable means, for example using an accelerometer if the range finder is static or an inertial measurement unit if the range finder is in motion. If tilt of the range finder is controlled or measured, then measured 2D data sets can be easily projected onto a horizontal plane. If tilt of the range finder is neither controlled nor measured, then measured 2D data sets still can be projected onto a horizontal plane using an assumed tilt, the accuracy of the resulting survey data being lower as a result.

Figure 2:
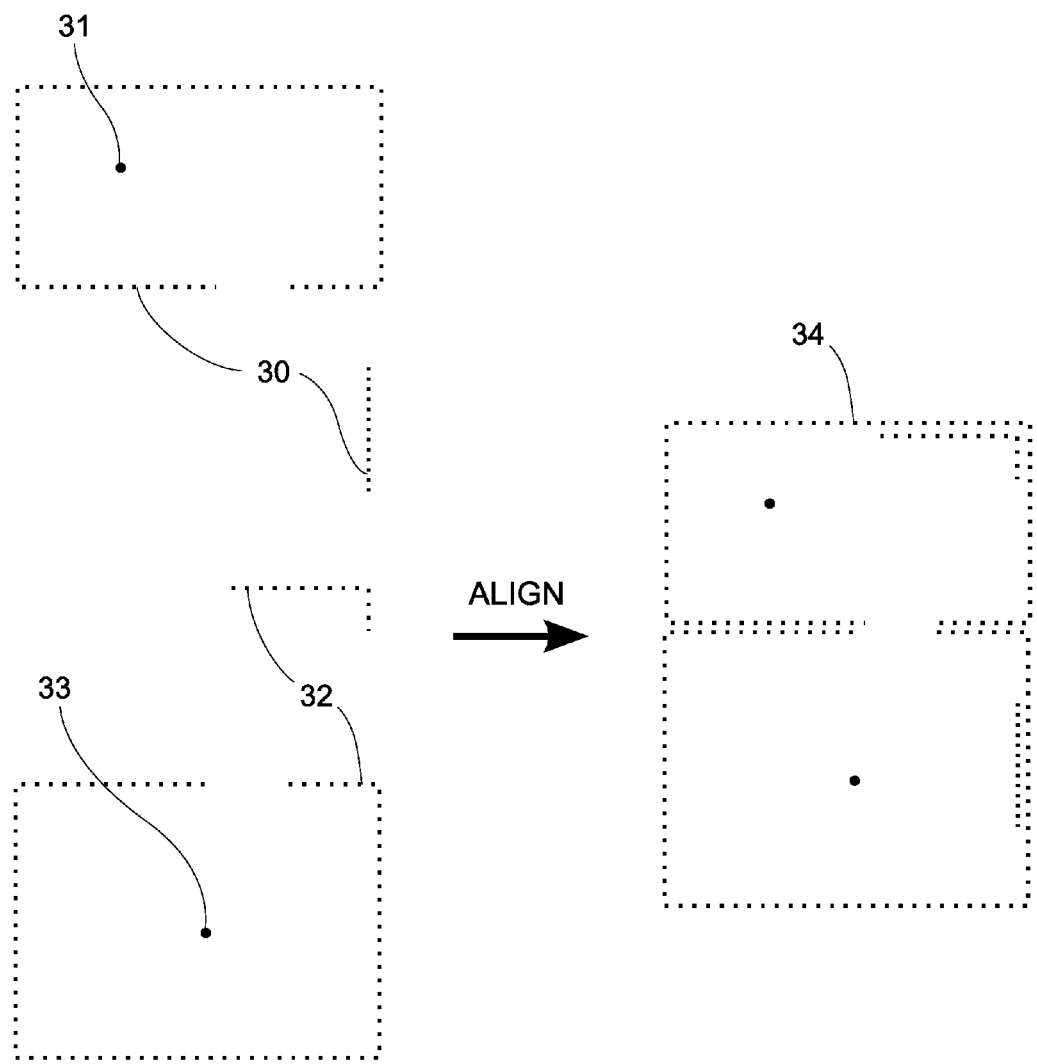
FIG. 2 schematically shows input and output of the 2D data set alignment process, which brings the 2D data sets into a common coordinate system and produces a map of indoor environment.

During surveying, the range finder is preferably repositioned in such a way that a measured 2D data set has points in common with at least one other 2D data set. To illustrate, FIG. 2 shows a first 2D data set 30 that was collected from the vantage point 31 and was projected onto a horizontal plane and a second 2D data set 32 that was collected from the vantage point 33 and was projected onto a horizontal plane. Vantage points 31 and 32 are located in adjacent rooms connected by a door that is seen as a discontinuity in the data sets 30 and 32. Part of another room can be seen from each vantage point 31 and 32, resulting in the two data sets having points in common, those points being the points that can be seen through the door. An alignment of the data sets 31 and 32 is performed by minimizing any suitable cost function, for example distances between the closest common points. The result of such an alignment is a combined 2D data set 34 consisting of 2D data sets 30 and 32 projected onto a horizontal plane and brought into a common coordinate system.

If the described projection and alignment procedure is performed automatically as new 2D data sets are measured, then a 2D map of a site being surveyed is built dynamically and map coordinates of any location from which a 2D data set measurement was performed are available together with the orientation of the range finder at that location. Such an approach is called Simultaneous Localization And Mapping (SLAM) and is well known in the field of robotics. The cited earlier references by Biber et al. and Kohlbrecher et el. can provide necessary details for methods and algorithms. In preferred embodiments a computing device 5 executes a SLAM algorithm and receives 2D data sets from the range finder 1 through a data path 6 that can be either wired or wireless. Other suitable algorithms resulting in projection onto a horizontal plane and alignment of 2D data sets are also contemplated.

In preferred embodiments an indoor surveying apparatus according to the present invention includes an inertial measurement unit (IMU) 17, as shown in FIG. 1. The IMU advantageously provides tilt compensation for a static range finder and computes change in position and orientation between two consecutive 2D data set measurements for a moving range finder. That computed change in position and orientation suffers from drift errors, but it can be advantageously used as an initial guess during a 2D data set alignment procedure and is supplied via data path 6 to the computing device 5 executing an algorithm for automatically projecting and aligning 2D data sets. Such an initial guess improves accuracy and speed of the alignment procedure. See the Kohlbrecher et el. reference for further details.

In preferred embodiments an indoor surveying apparatus according to the present invention further includes an electronic compass 18 that is used for measuring orientation of the 2D range finder and of the resulting floor plans relative to the earth and for providing heading information to the IMU 17 via data path 6 to improve accuracy of the IMU computations by reducing drift errors through a sensor fusion algorithm. Off-the-shelf IMUs often include an electronic compass for this reason.

Optical Imaging System

As shown in FIG. 1, one of the constituting subsystems of an indoor surveying apparatus according to the present invention is a calibrated optical imaging system 7 comprising an image sensor 9 and an objective lens 8 that has an optic axis 13.

One of the purposes of the imaging system is to capture images that can augment 2D data sets measured by the range finder and can aid in drawing floor plans. To be used for that purpose, the imaging system needs to be calibrated. Imaging system calibration has been discussed earlier in the description of a triangulation laser range finder. In addition to that calibration, position and orientation of the imaging system 7 relative to the range finder 1 and its measurement surface 2 also need to be calibrated and this can be done following the method taught in X. Brun et al. "Modeling and Calibration of Coupled Fish-Eye CCD Camera and Laser Range Scanner for Outdoor Environment Reconstruction" in Proc. 6th Int. Conf. on 3-D Digital Imaging and Modeling (2007). Further details about use of images captured by the imaging system in drawing floor plans will be discussed later in this disclosure.

Another purpose of the imaging system is to capture images of the environment in order to enhance collected survey data with visual information. When the imaging system's position and orientation relative to the range finder are calibrated, the process of 2D data set alignment and map creation can provide map positions and orientations of the imaging system for all captured images. This information makes it easy to create virtual tours for displaying survey data on a computing device, wherein the imaging system positions and shooting directions are displayed on a floor plan and images can be selected for viewing by selecting their positions on the floor plan. In preferred embodiments the optical imaging system 7 is capable of producing High Dynamic Range (HDR) images or using similar approaches based on combining several images taken at different exposures into a resulting image with equalized intensity distribution. This is usually advantageous to do for indoor environments, which often feature bright windows and darker corners.

It is contemplated that the imaging system can have more than one objective lens and more than one image sensor. In preferred embodiments the objective lens 8 of the optical imaging system 7 is a panoramic objective lens with a field of view of at least 180 degrees. Such a lens allows complete spherical coverage of the environment in just two shots by rotating the imaging system 7 substantially by 180 degrees around the axis 16 that is substantially perpendicular to the optic axis 13 and that passes substantially through the entrance pupil of the lens (not shown). The spherical coverage data can preferably be projected onto sides of a cube, thus producing six rectified images. This and other methods of processing and displaying panoramic images are well known to those skilled in the art. Typically, resolution of rectified images is lower at the edges of the field of view of the lens. To counter that effect, a three shot panorama can be captured instead by rotating the imaging system into three angular positions spaced about 120 degrees apart.

With a panoramic lens, it is preferable to have the imaging system be the top-most component of the apparatus to avoid unnecessary obstruction of a wide angle panoramic view above the panoramic lens by other components of the apparatus.

In preferred embodiments an indoor surveying apparatus according to the present invention comprises a stand 14 positioned on a floor and a rotator 15 mounted on the stand and coupled to the rest of the surveying apparatus. The rotator is a panoramic rotator well known to those skilled in the art. The purpose of the rotator is to minimize deviations of the rotation axis from the described preferred position and orientation and to enable repeatable rotation of a surveying apparatus into pre-determined angular positions. In preferred embodiments the rotator allows an indoor surveying apparatus according to the present invention to be repeatably rotated into two angular positions that are substantially 180 degrees apart from each other.

In preferred embodiments an indoor surveying apparatus according to the present invention comprises the computing device 19 executing an algorithm for computing position of a point on a floor relative to the surveying apparatus. Position of point 21 on the floor 20 is computed by triangulation using position of the image 22 of the point 21 on the image sensor 9, calibration coefficients of the imaging system 7, and distance from the imaging system 7 to the floor 20 that must be known and can be controlled by height of the stand 14. This functionality is useful during post-processing and analysis of collected survey data in certain applications, such as in forensic sciences.

Means for Drawing Floor Plans

Figure 3:
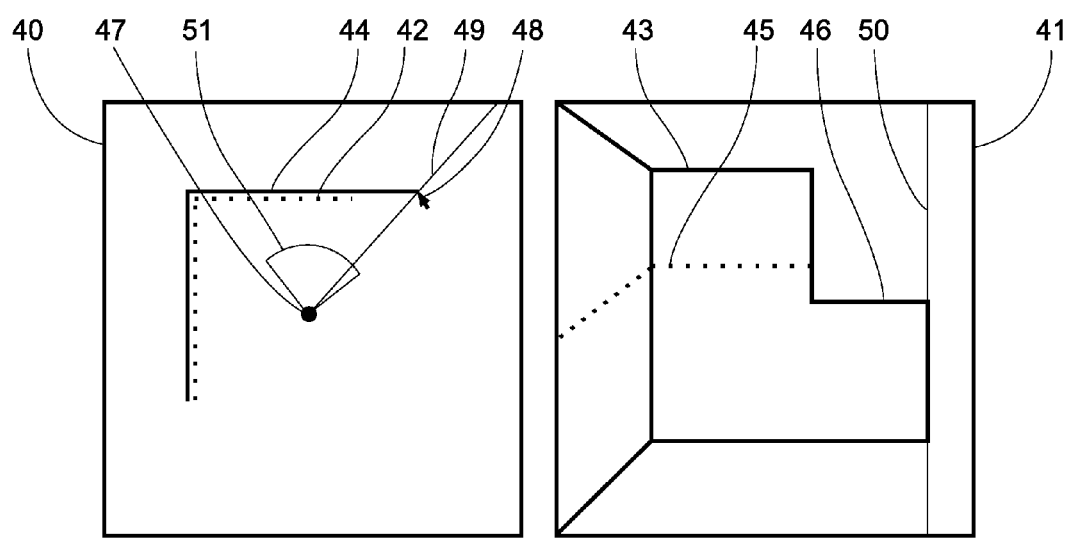
FIG. 3 is a schematic view of a user interface displayed by a computing device executing an algorithm for establishing positions and extents of walls, doors, and windows and for drawing floor plans according to one embodiment of the invention.

As shown in FIG. 1, one of the constituting subsystems of an indoor surveying apparatus according to the present invention is the computing device 11 executing an algorithm for establishing positions and extents of walls, doors, and windows and for drawing floor plans. The algorithm uses images captured by the calibrated optical imaging system 7 to fill in gaps in the 2D data sets, more specifically, to establish extents and position of walls, doors, and windows where relevant information was not collected by the range finder. FIG. 3 shows an example of user interface for an application for drawing floor plans that implements such an algorithm and the algorithm's steps are explained in the following paragraphs.

Projected and aligned 2D data sets 42 are displayed in a floor plan window 40. Window 41 displays images captured by the imaging system 7. In the current example, an image in the window 41 shows a full height wall 43 ending with a half-height wall 46 on the right side. Center 47 in the floor plan window 40 denotes the location from which the image shown in the window 41 was captured. Orientation of the imaging system at that location was determined during the alignment process, thus it is possible to display in the window 40 direction and extents of the field of view 51 that is visible in the image in the window 41. Dotted line 45 is a display of the 2D data set 42 projected onto the image in the window 41 using the calibration coefficients of the imaging system 7. In the example case shown in FIG. 3, the measurement surface of the range finder did not intersect the half-wall 46 during surveying and 2D data set information required to determine the extents of the half-wall 46 and position of its right edge is missing. Similar difficulties can arise with windows if the measurement surface is below a window or in cases when there are other objects, for example furniture, blocking line of sight from the range finder to a surface of interest.

A user input device, for example a mouse, a stylus, a touchscreen, or a touchpad, is used to draw a floor plan in the window 40. The wall 43 is drawn as a line 44 in the window 40 with a user input device cursor 48 displayed at a current drawing position. Since the orientation of the imaging system 7 at the center 47 and the field of view 51 of the image in the window 41 are known, it is possible to display in the window 40 a current viewing direction indicator 49, which corresponds to the current cursor position 48 and simultaneously display it as a vertical viewing direction indicator 50 in the window 41. Whenever the user input device changes displayed cursor position 48, the viewing direction indicator 49 rotates around center 47 and the vertical viewing direction indicator 50 slides right or left. To complete the wall 43 by drawing the half-wall 46, the line 44 is continued to the right beyond the end of the 2D data set 42 in the window 40 until the vertical viewing direction indicator 50 coincides with the right edge of the half wall 46 in the window 41. This is how calibrated images can be used to fill in gaps in 2D data sets. Doors, windows, and obstructed corners can also be measured and drawn using the described algorithm.

Inter-Operation of the Subsystems

The described subsystems are the building blocks for an indoor surveying apparatus according to the present invention. Working together, they enable rapid surveying, reduce time spent on-site collecting data, and time spent post-processing data and drawing floor plans.

While the described subsystems can be combined together into a system as discrete components some of which are available off-the-shelf, additional advantages can be obtained if the system is designed as a whole. For example, the range finder 1 and the optical imaging system 7 can share a processing unit that computes 2D data sets and does image processing, such as white balance and HDR. The processing unit can also execute a SLAM code and thus implement the computing device 5 executing an algorithm for automatically projecting and aligning 2D data sets. The processing unit can further execute an IMU code, if an IMU is present. Drawing floor plans and measuring positions of points on a floor can be combined within one software application.

Using a high frame rate optical imaging system and high acquisition rate a range finder allows capturing images, collecting 2D data sets and building a site map dynamically, while walking from room to room. Use of an IMU is preferred for this mode of operation. The map data and image data can be transmitted wirelessly to and displayed on a portable computing device, for example a netbook or a tablet, for real time visual assessment of site coverage and image quality. The portable computing device can also function as a remote control for the indoor surveying apparatus.

Thus, specific details of an indoor surveying apparatus have been disclosed. It should be apparent, however, to those skilled in the art that many more modifications besides those already described are possible without departing from the inventive concepts herein. The invention, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An indoor surveying apparatus comprising:
    a 2D range finder having a 2D measurement surface, whereby the 2D range finder measures a 2D data set comprised of a plurality of points located at intersection of the 2D measurement surface and surfaces of other objects;
    a computing device executing an algorithm for automatically projecting 2D data sets measured by the 2D range finder onto a horizontal plane and automatically aligning the projected 2D data sets to construct a map of indoor environment consisting of points of the projected 2D data sets;
    a calibrated optical imaging system coupled to the 2D range finder, comprising an image sensor and an objective lens, the calibrated optical imaging system having calibration coefficients that depend on a focal length and a distortion of the objective lens, a position and an orientation of the image sensor relative to the objective lens, and a position and an orientation of the objective lens relative to the 2D range finder, whereby points from a 2D data set measured by the 2D range finder can be projected onto an image captured by the calibrated optical imaging system using the calibration coefficients; and
    a computing device executing an algorithm for establishing positions and extents of walls, doors, and windows and for drawing floor plans using information from the map of indoor environment, images captured by the calibrated optical imaging system, and the calibration coefficients of the calibrated optical imaging system, whereby the images can be used for establishing positions and extents of walls, doors, and windows where the map of indoor environment is missing.

2. A surveying apparatus according to claim 1, wherein the 2D range finder is a scanning laser range finder.

3. A surveying apparatus according to claim 1, wherein the 2D range finder is a triangulation laser range finger comprising a laser source with a 2D emission pattern and the calibrated optical imaging system, whereby the calibrated optical imaging system is used for both capturing images and measuring 2D data sets.

4. A surveying apparatus according to claim 1, wherein the objective lens of the calibrated optical imaging system is a panoramic objective lens having an optic axis, an entrance pupil, and a field of view of at least 180 degrees.

5. A surveying apparatus according to claim 4, further comprising a stand and a rotator through which the surveying apparatus is coupled to the stand, the rotator having a rotation axis that is substantially perpendicular to the optic axis of the objective lens and passes substantially through the entrance pupil of the objective lens, whereby the rotator enables the surveying apparatus to be rotated around the rotation axis relative to the stand.

6. A surveying apparatus according to claim 5, wherein the rotator enables the surveying apparatus to be repeatably rotated into two angular positions that are substantially 180 degrees apart from each other.

7. A surveying apparatus according to claim 5, wherein the rotator enables the surveying apparatus to be repeatably rotated into three angular positions that are substantially 120 degrees apart from each other.

8. A surveying apparatus according to claim 1, further comprising an inertial measurement unit.

9. A surveying apparatus according to claim 1, further comprising an electronic compass.

10. A surveying apparatus according to claim 1, further comprising a computing device executing an algorithm for computing position of a point on a floor relative to the surveying apparatus by triangulation using images captured by the calibrated optical imaging system, the calibration coefficients of the calibrated optical imaging system, and a distance from the calibrated optical imaging system to the floor.

* * * * *